Patented June 28, 1932

1,864,893

UNITED STATES PATENT OFFICE

RUSSELL B. CROWELL AND SAMUEL RAY EBE, OF AGNEW, CALIFORNIA, ASSIGNORS TO THE AMERICAN SOLVENTS AND CHEMICAL CORPORATION, OF NEW YORK, N. Y., A CORPORATION OF DELAWARE

PROCESS FOR MAKING ESTERS OF BUTYL ALCOHOL

No Drawing. Application filed September 24, 1928. Serial No. 308,132.

This invention relates to a process for making high boiling esters of butyl alcohol. More particularly it has to do with the production of phthalic esters of butyl alcohol such as dibutyl phthalate.

A number of processes for making butyl esters have been proposed. One of such processes consists in forming a mixture of a carboxylic acid such as phthalic acid and butyl alcohol, heating the mixture, passing dry hydrochloric acid gas into the heated mixture, and distilling the product thus formed.

Another process for making high boiling butyl esters comprises adding phthalic anhydride to normal butyl alcohol, heating the mixture for about 8 hours at a temperature of 117° C. to form the mono-butyl phthalate, adding dry hydrochloric acid to the mixture, and heating the mixture again to 117° C. for about 8 hours to form dibutyl phthalate. The layer containing dibutyl phthalate is separated from the layer containing water, and is then distilled for the purpose of recovering the dibutyl phthalate in pure form.

The known processes have the disadvantage in that the dibutyl phthalate formed is an impure product, and has associated therewith impurities which can only be separated therefrom by distillation. As the boiling point of dibutyl phthalate is 340° C., the distillation must be effected at a high temperature and under a very high degree of vacuum. Also, the percentage yield of esters produced by these processes is low and variable, usually ranging between 60 and 85%.

One of the objects of this invention is the provision of a process whereby it is possible to produce butyl esters which are in a substantially pure state, and necessitate no distillation.

Another object of this invention is the provision of a process for making butyl esters in which the percentage yield of butyl ester is high and substantially fixed, usually ranging between 95% and 98%.

A further object of this invention is a provision of a process for making butyl esters in which the water, as it is formed in the reaction, is removed in the form of a binary minimum boiling point mixture of alcohol and water.

In carrying out the process of this invention, 1000 lbs. of phthalic anhydride, about 1250 lbs. of butyl alcohol, and about 10 lbs. of a catalyst such as sulphuric acid or other similar acid are placed in a suitable tank or still. The tank or still in which the reaction mass is placed should be made of a material which is unaffected by the reacting ingredients when in contact therewith, and should be provided with a coil or jacket for heating. After the batch mixture has been placed in the tank, the tank is heated to a temperature of about 82° to 87° C., care being taken that the temperature does not exceed 87° C.

The reaction mass is allowed to digest for about 24 hours, or until a considerable amount of butyl ester has been produced. The reaction mixture is then slowly distilled under a vacuum. As the esterification proceeds, water is formed. By slowly distilling the reaction mixture under a vacuum the water is removed as it is produced in the form of a binary minimum boiling point mixture of butyl alcohol and water. This mixture separates into two layers upon cooling, an upper layer consisting mostly of butyl alcohol, and a lower layer made up primarily of water. The rate at which the distillation is conducted is so regulated that the distillate or binary mixture of alcohol and water contains very little butyl alcohol over that required to form the binary mixture. When most of the water is removed, and a large part of the phthalic anhydride has been converted into the ester, the vacuum is slightly increased. This is necessary in order to remove the last traces of water, complete the reaction, and to remove any excess of butyl alcohol.

It is to be noted that only a moderate degree of vacuum is required for the distillation of the reaction mass to remove the water being produced as the reaction proceeds. The degree of vacuum employed is that equivalent to about 20 inches of mercury at the start of the distillation to 26 inches at the completion of the distillation. The distillation can be accomplished satisfactorily without the use of a still column or reflux condenser.

The amount of butyl alcohol used in the process is slightly more than is required to react with the phthalic anhydride. A slight excess is necessary in order to remove the water which is formed during the reaction as a binary minimum boiling mixture of butyl alcohol and water. The butyl alcohol contained in the binary mixture is readily recovered and may be used in succeeding batches.

The product remaining in the tank or still is dibutyl phthalate which is in a substantially pure state. The yield of dibutyl phthalate resulting from the practice of the process of this invention is about 97%.

The dibutyl phthalate thus formed is then washed with a solution of sodium carbonate, washed with water, and then dried.

If it is desired to deodorize the dibutyl phthalate this may be accomplished by heating same to a temperature of about 118° C. while agitating the ester with a current of dry steam, and then filtering through a little carbon. This treatment completely removes the odor from the butyl ester, and any small amount of color remaining.

While the process of the present invention has been described in connection with the production of dibutyl phthalate, it is to be understood that this process is also applicable to the production of other high boiling dibutyl esters such as butyl tartrate, butyl oxalate or stearate.

Having described the invention, what is claimed as new and is desired to be secured by Letters Patent is set out in the appended claims.

1. The process of making dibutyl phthalate which comprises reacting phthalic anhydride and butyl alcohol in the presence of a strong mineral acid catalyst, and subjecting the reaction mass to vacuum distillation at a temperature substantially within the range of 82° to 87° C. as the reaction proceeds to remove the water being produced in the form of a binary mixture of butyl alcohol and water.

2. The process of making dibutyl phthalate which comprises reacting phthalic anhydride and butyl alcohol in the presence of a strong mineral acid catalyst, and subjecting the reaction mass to vacuum distillation at a temperature substantially within the range of 82° to 87° C. and not exceeding 87° C. as the reaction proceeds to remove the water being produced in the form of a binary mixture of butyl alcohol and water.

3. The process making dibutyl phthalate which comprises reacting phthalic anhydride and butyl alcohol in the presence of a strong mineral acid catalyst, heating the reaction mass to a temperature substantially within the range of 82° to 87° C. and not exceeding 87° C., and distilling the reaction mass under a vacuum as the reaction proceeds to remove the water being produced in the form of a binary mixture of butyl alcohol and water.

4. The process of making dibutyl phthalate which comprises reacting phthalic anhydride and butyl alcohol in the presence of a strong mineral acid catalyst, heating the reaction mass to a temperature substantially within the range of 82° to 87° C. and not exceeding 87° C., distilling the reaction mass under a vacuum as the reaction proceeds to remove the water being produced in the form of a binary mixture of butyl alcohol and water, neutralizing the catalyst, and washing and drying the ester produced.

5. The process of making dibutyl phthalate which comprises reacting phthalic anhydride and butyl alcohol in the presence of a strong mineral acid catalyst, heating the reaction mass to a temperature substantially within the range of 82° to 87° C. and not exceeding 87° C., distilling the reaction mass under a vacuum as the reaction proceeds to remove the water being produced in the form of a binary mixture of butyl alcohol and water, neutralizing the catalyst, washing and drying the dibutyl phthalate thus produced, heating the thus dried dibutyl phthalate to a temperature of about 118° C., and agitating same with dry steam so as to deodorize the said ester.

In testimony whereof we affix our signatures.

RUSSELL B. CROWELL.
SAMUEL RAY EBE.